United States Patent
Goto

(10) Patent No.: US 7,897,221 B2
(45) Date of Patent: Mar. 1, 2011

(54) PRODUCTION OF BLADE FOR OFFICE APPLIANCES

(75) Inventor: Taihei Goto, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 884 days.

(21) Appl. No.: 11/429,212

(22) Filed: May 8, 2006

(65) Prior Publication Data

US 2006/0267227 A1 Nov. 30, 2006

(30) Foreign Application Priority Data

May 10, 2005 (JP) .................. 2005-136953

(51) Int. Cl.
*B32B 27/08* (2006.01)
*B29C 45/02* (2006.01)
(52) U.S. Cl. .......................... 428/35.7; 264/35
(58) Field of Classification Search .............. 428/35.7; 249/83; 264/35, 255, 328.8
See application file for complete search history.

(56) References Cited

U.S. PATENT DOCUMENTS 4,579,520 A 4/1986 Gellert

FOREIGN PATENT DOCUMENTS

| CN | 2671790 Y | | 1/2005 |
|---|---|---|---|
| JP | 11-065343 | * | 3/1999 |
| JP | 11249422 | | 9/1999 |
| JP | 200043104 A | | 2/2000 |
| JP | 2001-117358 A | | 4/2001 |

OTHER PUBLICATIONS

Machine Translation of JP11-065343 Mar. 1999.*
Machine Translation of JP 2001-117358, Apr. 2001.*
Chinese Office Action issued Jun. 27, 2008 in counterpart CN application No. 2006100791291 (English and Chinese), 10 pages.
Japanese Office Action dated May 25, 2010, with an English language translation.

* cited by examiner

*Primary Examiner* — Mark Ruthkosky
*Assistant Examiner* — Erik Kashnikow
(74) *Attorney, Agent, or Firm* — Sughrue Mion, PLLC

(57) ABSTRACT

A mold for producing a blade for office appliances, wherein a resilient member made of a heat-curable material is adhered to a base plate. The mold includes a cavity corresponding to the resilient member of the blade, a space for placing the base plate adjacent to the cavity, a runner for passing the heat-curable material therethrough and injecting the heat-curable material into the cavity, and a heating means adjacent to the cavity, for causing curing of the heat-curable material in the cavity. At least a part of said runner, including an outlet thereof, is comprised of a cold runner for maintains the heat-curable material, which remains in the cold runner, at a temperature lower than its curing temperature.

2 Claims, 9 Drawing Sheets

(a)

(b)

(a)

(b)

(a)

(b)

PRODUCTION OF BLADE FOR OFFICE APPLIANCES

FIELD OF THE INVENTION

The present invention relates to production of a blade for office appliances, comprising a base plate having a surface on which a resilient member made of a heat-curable material is adhered, and in particular to a mold and a method for producing such a blade. The heat-curable material may suitably comprise silicone rubber, two-liquid type polyurethane rubber, fluorine rubber, chloroprene rubber, etc. The present invention will be explained below with particular reference to silicone rubber, though other heat-curable materials are also applicable to the blade to which the present invention pertains.

RELATED ART

In image forming device of electrophotographic type or electrostatic type, in particular color image forming device, such as copying machine, facsimile machine, printer, etc., non-magnetic developer is charged and transferred onto a photosensitive drum by the charge. The developer is carried on the outer peripheral surface of a developing drum, and the amount of the developer fed by the rotation of the developing drum is limited by a developer amount limiting blade which is mounted opposite to the outer peripheral surface of the developing drum. The blade also serves to cause electrification of the developer due to friction.

As for the developer amount limiting blade, there is known a blade which includes a silicone rubber member having a sufficient flexibility for forming a clearance that allows the passage of the developer, and suitable properties for causing friction-electrification of the developer. The silicone rubber member is adhered to one side surface of a thin metal plate.

The image forming device of the above-mentioned type also includes a cleaning blade for cleaning the surface of the photosensitive drum, wherein the cleaning blade is made of a silicone rubber member adhered to one side surface of a thin metal plate. The silicone rubber member of the cleaning blade is urged against the photosensitive drum under rotation, so as to remove the developer carried on the photosensitive drum.

The developer amount limiting blade and the cleaning blade having a structure wherein a silicone rubber member is adhered to one side surface of a base metal plate, as mentioned above, are collectively referred to as "blade for office appliances". As disclosed in JP-2001-117358A, for example, it has been a general practice to produce such blade for office appliances by applying adhesive to the base plate, placing the base plate in a mold, and feeding silicone rubber material into the mold cavity, either by transfer mold process or injection molding process, so as to form a silicone rubber member and adhere it to the base plate while they are still within the mold.

With reference to FIGS. 1(a) to 1(c), there is shown a conventional blade for office appliances in the form of a developer amount limiting blade 90, which includes a thin base plate 91 and a silicone rubber member 92 adhered to one side surface 91a of the base plate 91. The blade 90 is arranged in engagement with the outer peripheral surface 93a of a developing drum 93, or to leave a slight clearance from the developing drum 93, in order to limit the thickness of the layer of the developer 94 on the outer peripheral surface 93a of the developing drum 93, with the silicone rubber member 92 in direct contact with the developer 94.

A transfer mold 80 suitable for producing the developer amount limiting blade 90 by transfer molding process is schematically shown in FIGS. 2(a) and 2(b), illustrating the closed state and the open state of the mold 80, respectively. The transfer mold 80 includes a lower mold member 82 provided with a space 89 for placing the base plate 91 of the blade 90, and an upper mold member 81 provided with a cavity 83 corresponding to the silicone rubber member 92 of the blade 90, and also with a runner 85 for passing silicone rubber material 88 therethrough as it is supplied to the cavity 83.

In order to produce the developer amount limiting blade 90 with the transfer mold 80, the base plate 91 previously applied with an adhesive is placed in the space 89, and the upper mold member 81 and the lower mold member 82 are then mated with each other so as to close the mold 80. Subsequently, the silicone rubber material 88 accommodated within a cylinder 86 is extruded from an outlet 86a of the cylinder 86 by moving a plunger 87 downwards, so that the rubber material 88 is passed through the runner 85 and filled in the cavity 83.

Since silicone rubber material 88 is a heat-curable material, the silicone rubber material 88 filled in the cavity is cured as it is heated by a heating means (not shown), which is provided for the mold 80, and adhered to the base plate 91 by the adhesive previously applied thereto. On this occasion, the silicone rubber material remaining in the runner 85 inevitably undergoes curing due to the heat from the heating means. As a result, when the mold 80 is opened to remove the molded body therefrom, the molded body is integral with the runner rubber 95. Thus, in order to obtain a final product of the developer amount limiting blade 90, it is necessary to remove the runner rubber 95 from the molded body.

An injection mold 70 suitable for producing the developer amount limiting blade 90 by carrying out liquid injection molding (LIM) process or reaction injection molding (RIM) process is schematically shown in FIGS. 3(a) and 3(b), illustrating the closed state of the mold 70 before injection of the silicone rubber material, and the open state of the mold 70, respectively. The injection mold 70 includes a lower mold member 72 which is provided with a space for placing the base plate 91, a cavity 73 corresponding to the silicone rubber member 92 and a runner 75 for passing the silicone rubber material as it is injected into the cavity 73, as well as an upper mold member 71 which is urged against the lower mold member 72 for closing the injection mold 70.

In order to produce the developer amount limiting blade 90 with the injection mold 70, the base plate 91 previously applied with an adhesive is placed in the space 79, and the injection mold 70 is then closed. The silicone rubber material is injected from an injection nozzle 78, passed through the runner 75 and filled into the cavity 73.

The molded body is cured and then removed from the injection mold 70 after opening it. As in the case of transfer molding process explained above, the molded body includes a runner rubber 95A which must be removed to obtain the final product of the developer amount limiting blade 90.

As explained above, when a blade 90 for office appliances is produced by using the transfer mold 80 or the injection mold 70, the runner rubber 95, 95A, which has been inevitably cured by the heating means for curing the silicone rubber material filling the cavity 83, 73, must be removed from the molded body and discarded. The removal and disposition of the runner rubber not only requires additional process steps, but also involves increased material cost and discarding cost.

DISCLOSURE OF THE INVENTION

It is therefore a primary object of the present invention to provide an improved technology for producing a blade for office appliances, which is capable of preventing formation of unnecessary runner rubber.

A first aspect of the present invention resides in a mold for producing a blade for office appliances, wherein said blade comprises a base plate, and a resilient member made of a heat-curable material and adhered to the base plate, said mold comprising:

a cavity corresponding to the resilient member of the blade;
a space for placing said base plate adjacent to said cavity;
a runner for passing said heat-curable material therethrough and injecting said heat-curable material into said cavity; and
a heating means adjacent to said cavity, for causing thermosetting of said heat-curable material in said cavity;
at least a part of said runner, including an outlet thereof, is comprised of a cold runner for maintaining said heat-curable material at a temperature lower than a curing temperature of the heat-curable material during its passage and stay in said cold runner.

With the first aspect of the present invention, at least a part of the runner, including an outlet thereof, is comprised of a cold runner. Therefore, the heat-curable material remaining in the cold runner is maintained at a temperature lower than its curing temperature and thus prevented from curing, thereby making it possible to effectively eliminate formation of undesirable runner rubber.

A second aspect of the present invention resides in the mold according to the first aspect, wherein the cold runner is arranged on one side of the space for the base plate, which is opposite to the cavity, so that the outlet of the runner opens into the space for the base plate.

With the second aspect of the present invention, the arrangement of the cold runner on that side of the space for the base plate, which is opposite to the cavity, makes it possible to provide improved cooling effect and cooling efficiency of the cold runner.

A third aspect of the present invention resides a mold according to the first or second aspect, which further comprises heat insulation means arranged between the heating means and the cold runner, for suppressing heat conductance form the heating means to the cold runner.

With the third aspect of the present invention, the provision of the insulation means between the heating means and the cold runner makes it possible to suppress heat conductance form the heating means to the cold runner, so as to provide even more improved cooling effect and cooling efficiency of the cold runner.

A fourth aspect of the present invention resides in a mold according to the second or third aspect, which further comprises a closure pin for closing or opening the outlet of said cold runner, said closure pin having a tip end which is situated, when the outlet of said cold runner is closed, substantially on a same plane as an edge surface of said space for said base plate on a side of said cold runner, or to project from said plane.

With the fourth aspect of the present invention, the provision of the closure pin having a tip end which is situated, when the outlet of said cold runner is closed, at a specifically defined position, makes it possible to prevent leakage of the heat-curable material from the cold runner, when the mold is opened, thereby eliminating requirement for removal of burrs that may be otherwise caused due to the curing of the heat-curable material.

A fifth aspect of the present invention resides in a blade for office appliances, comprising a base plate, and a resilient member made of a heat-curable material and adhered to said base plate, said heat-curable material having been subjected to curing in the cavity of the mold according to any one of the second to the fourth aspects, with said base plate placed in said space of the mold, so that said resilient member is adhered to said base plate, wherein said base plate has a through hole for guiding said heat-curable material from said cold runner into said cavity of the mold.

With the fifth aspect of the present invention, the provision of the through hole in the base plate for guiding the heat-curable material from the cold runner into the cavity of the mold makes it possible to inject the heat-curable material from the cold runner on the back side of the base plate into the cavity with the minimized distance, so as to allow molding of the product with an improved heat efficiency.

A sixth aspect of the present invention resides in a blade for office appliances according to the fifth aspect, wherein said resilient member comprises a strip-like main body portion having a side edge, and a tab projecting from said side edge of the main body portion, and wherein said through hole is formed in that portion of the base plate, to which said tab of the resilient member is adhered.

With the sixth aspect of the present invention, due to the provision of the tab projecting from a side edge of the strip-like main body portion of the resilient member, the heat-curable material from the cold runner is once guided into the cavity portion which corresponds to the tab so as to realize a smooth flow of the heat-curable material, thereby allowing the resilient member to be molded with a higher uniformity.

A seventh aspect of the present invention resides in a method for manufacturing a blade for office appliances according to the fifth or sixth aspect, which comprises:

applying an adhesive to said base plate and then placing said base plate in said space of said mold in an open state thereof, with said through hole of the base plate opposed to said outlet of the cold runner;

feeding said heat-curable material into said runner, with said mold closed, and subjecting the heat-curable material to curing in said cavity of the mold.

With the seventh aspect of the present invention, it is possible to effectively eliminate formation of undesirable runner rubber. Thus, there is no need for removal of burrs that may be otherwise caused due to the curing of the heat-curable material.

An eighth aspect of the present invention resides in a method according to the seventh aspect, which further comprises closing said outlet of the cold runner is by said closure member, after said heat-curable material has been fed into the runner and filled in said cavity of the mold.

With the eighth aspect of the present invention, due to the closure by means of the closure member, it possible to prevent leakage of the heat-curable material from the cold runner, when the mold is opened.

BRIEF DESCRIPTION OF THE DRAWINGS

The present invention will be explained below in further detail, with reference to the preferred embodiments shown in the accompanying drawings.

DESCRIPTION OF THE PREFERRED EMBODIMENTS

Figure 1:
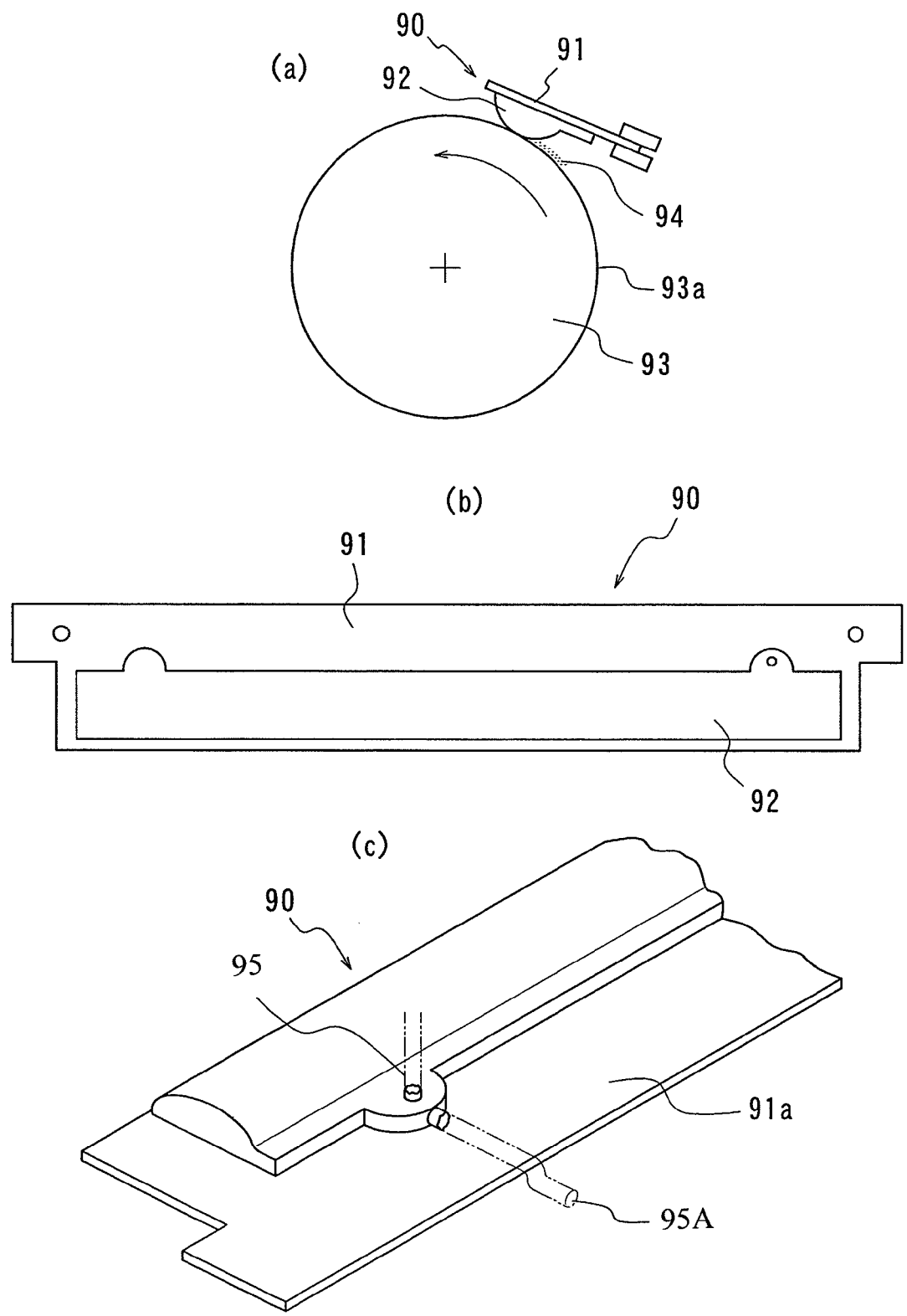
FIG. 1(a) is a schematic view showing a conventional developer mount limiting blade.
FIGS. 1(b) and 1(c) are a plan view and a perspective view of the blade, respectively.
Figure 2:
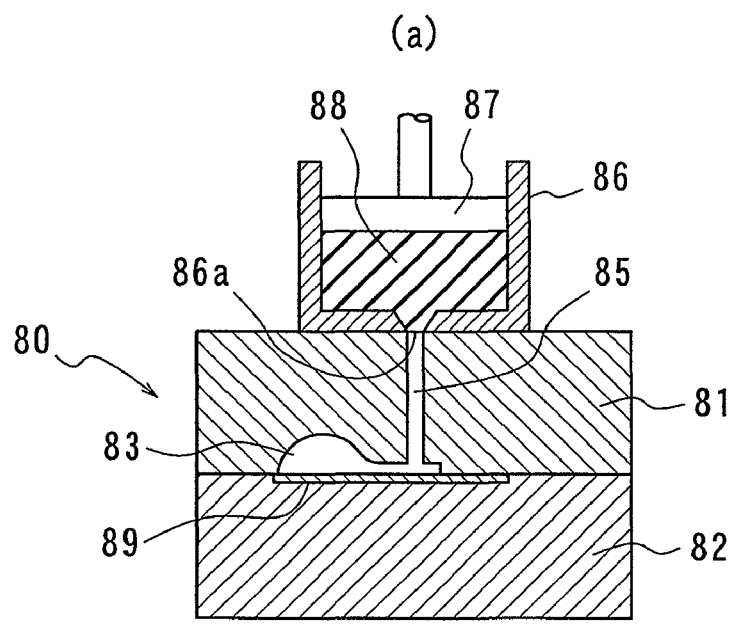
FIGS. 2(a) and 2(b) are schematic views of a transfer mold suitable for producing the conventional developer mount limiting blade, in its closed state and opened state, respectively.
Figure 2:
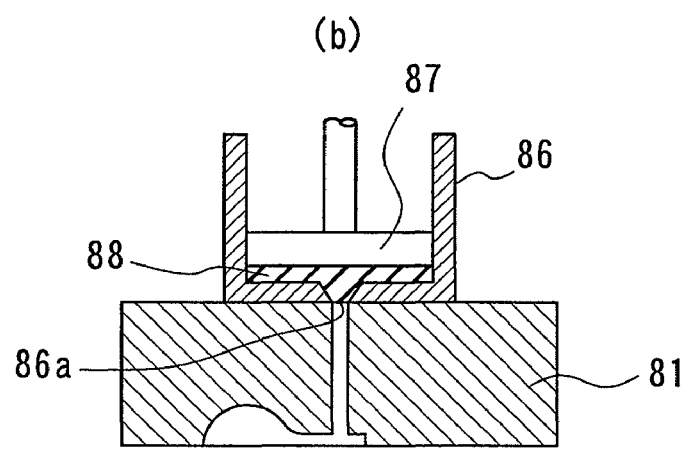
Figure 2:
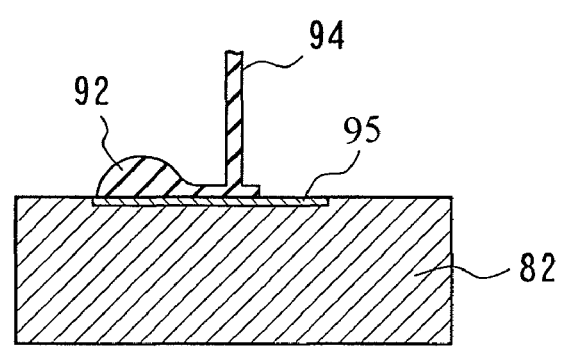
Figure 3:
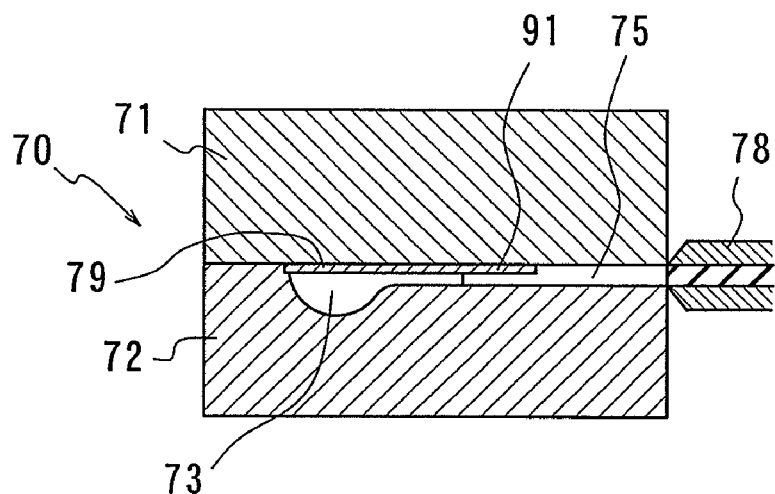
FIGS. 3(a) and 3(b) are schematic views of an injection mold suitable for producing the conventional developer mount limiting blade, in its closed state and opened state, respectively.
Figure 3:
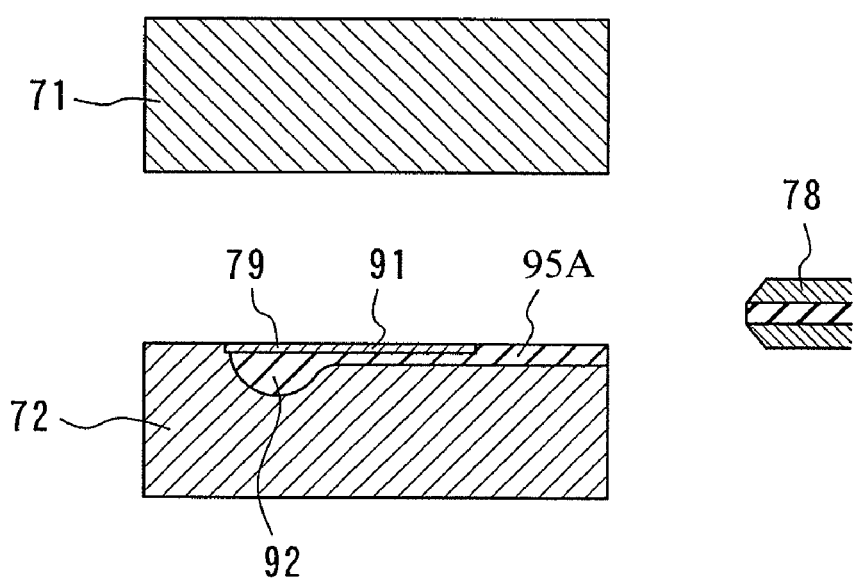
Figure 4:
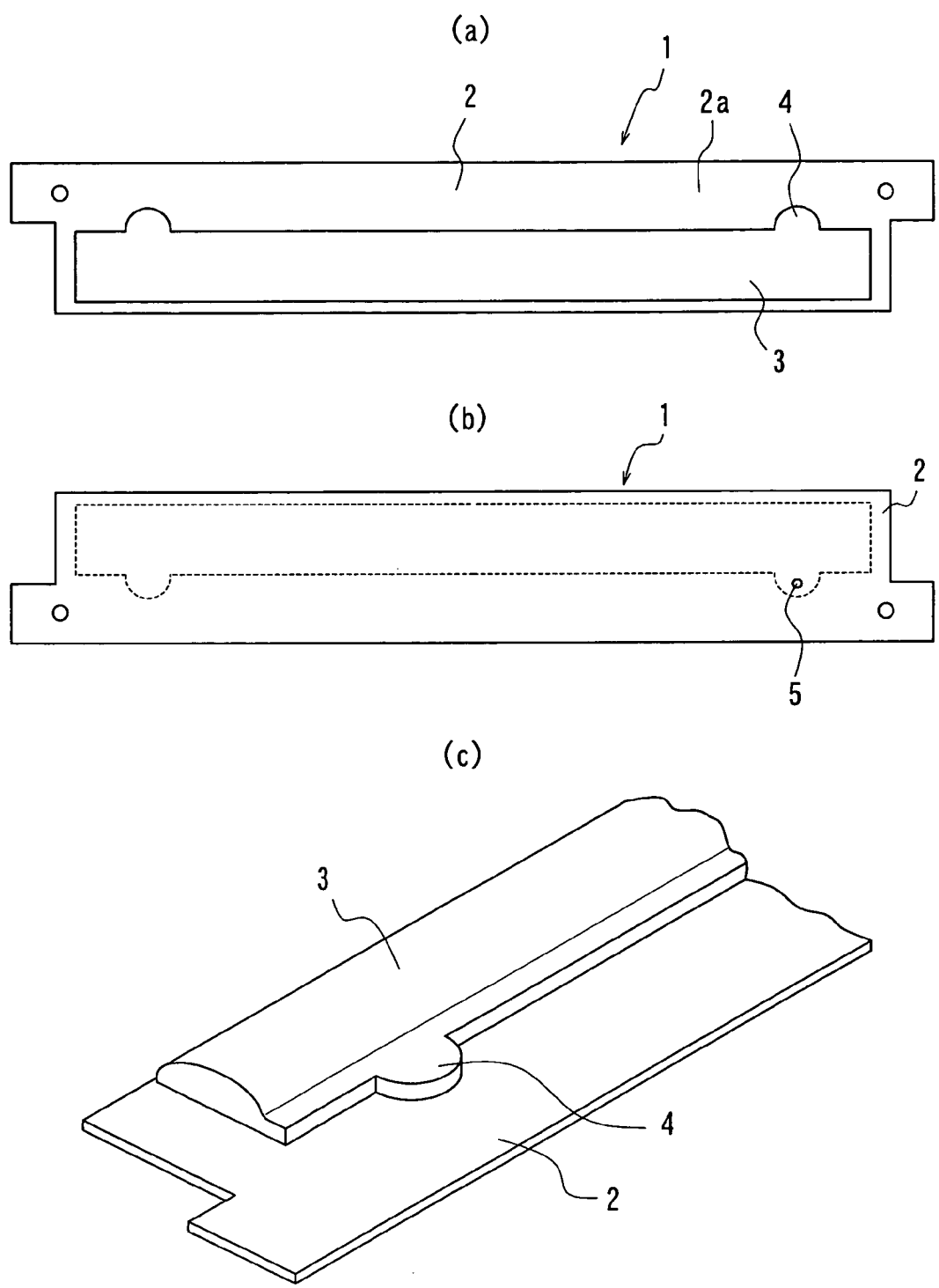
FIGS. 4(a), 4(b) and 4(c) are, respectively, schematic front view, rear view and perspective view of a developer mount limiting blade according to one embodiment of the present invention.

With reference to FIGS. 4(a) to 4(c), there is shown a developer amount limiting blade according to a preferred embodiment of the present invention. The developer amount limiting blade is generally denoted by reference numeral 1, and includes a thin metal plate 2 and a resilient member 3 made of heat-curable silicone rubber material, wherein silicone rubber member 3 is adhered to one side surface 2a of the metal plate 2.

Figure 5:
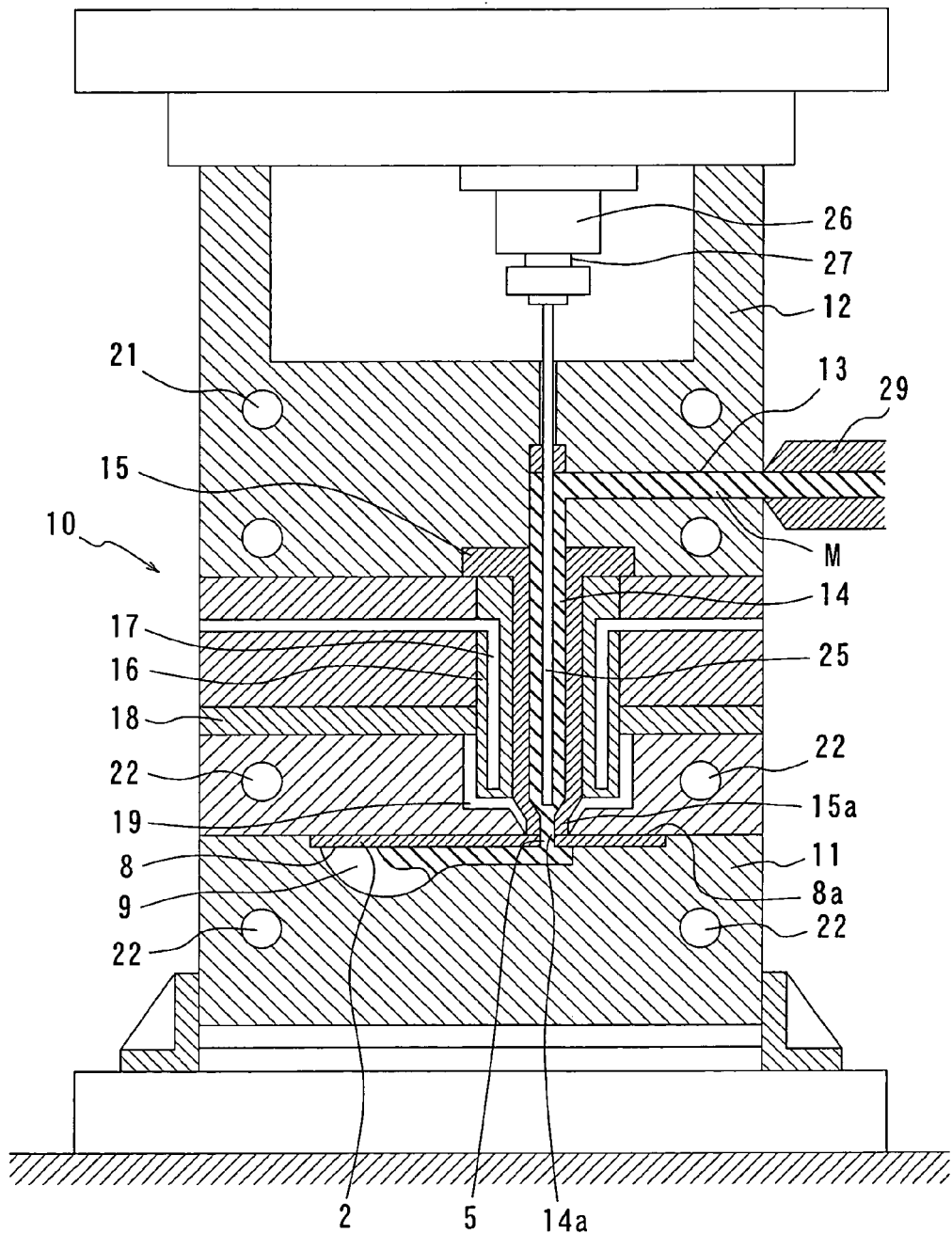
FIGS. 5(a) and 5(b) are sectional views of an injection molding machine, showing, respectively, an opened state and a closed state of the mold according to a preferred embodiment the present invention.
Figure 5:
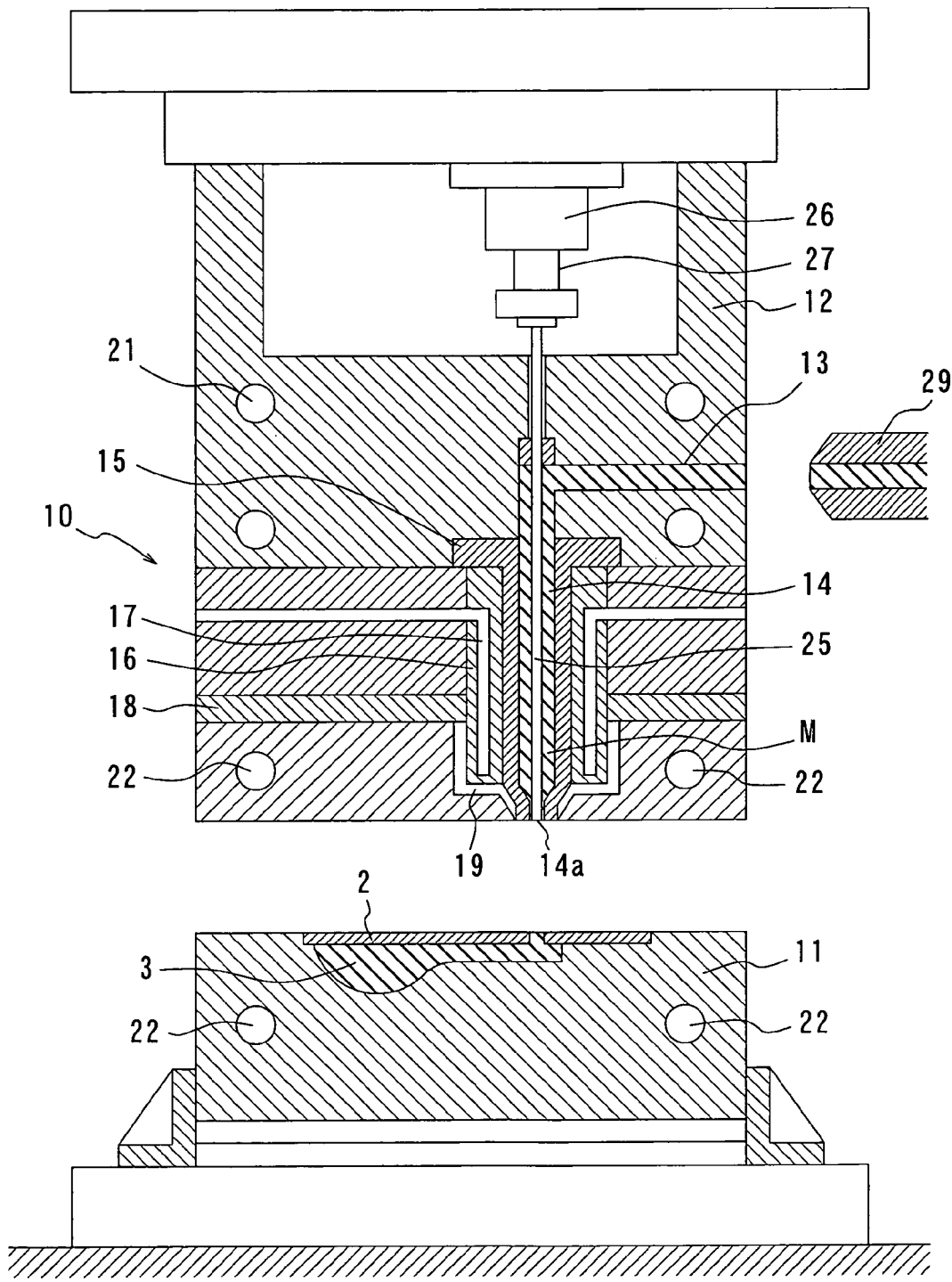

An injection molding machine including an injection mold 10 according to a preferred embodiment the present invention is shown in FIGS. 5(a) and 5(b). The injection mold 10 is suitable for producing the developer amount limiting blade 1 according to the present invention, by carrying out liquid injection molding (LIM) process or reaction injection molding (RIM) process. The injection mold 10 includes a lower mold member 11 provided with a space 8 for placing the metal plate 2 of the developer amount limiting blade 1 thereon, and a cavity 9 which corresponds to the silicone rubber member 3 of the blade 1. The injection mold 10 further includes an upper mold member 12 provided with a runner 13 for passing the silicone rubber material M therethrough and guiding it into the cavity 9. The runner 13 is connected to an injection nozzle 29 for the silicone rubber material M, when the upper mold member 12 is mated with the lower mold member 11 to close the mold 10, as shown in FIG. 5(a), and disconnected from the injection nozzle 29, when the upper mold member 12 is lifted from the lower mold member 11 to open the mold 10, as shown in FIG. 5(b).

Referring back to FIGS. 4(a) to 4(c), the silicone rubber member 3 includes a strip-like main body and at least one tab 4 which projects from a side edge of the main body portion. The tab 4 corresponds to a tab formation space in the mold, which constitutes an inlet of the silicone rubber material into the cavity 9. It is preferred that the tab 4 is arranged at a location spaced from the developer amount limiting portion of the silicone rubber member 3, in order to avoid any interference of the tab 4 with the developer amount limiting portion of the silicone rubber member 3 when the blade 1, in particular the silicone rubber member 3, is brought to a position adjacent to, or in engagement with the developing roller for limiting the amount of the developer.

It is further preferred that the silicone rubber material M is injected into the cavity 9 from the tab formation space at a single location, in order to effectively avoid formation of weld line of the silicone rubber material within the mold. It is also preferred that the tab formation space is arranged at one end in the longitudinal direction of the elongate cavity 9, so as to further suppress formation of weld lines and improve the molding precision of the silicone rubber member 3.

As shown in FIGS. 5(a) and 5(b), at least part of the runner, which includes the outlet 14a, is comprised of a cold runner 14 which can be cooled by coolant circulated through a cooling jacket 16. More specifically, the cold runner 14 of substantially cylindrical shape is defined by a bush 15 which is in contact with the cooling jacket 16 of substantially cylindrical shape. Reference numeral 15a in FIG. 5(a) denotes a lower tip end portion of the bush 15, which defines the outlet 14a of the cold runner 14. The cooling jacket 16 is provided with a coolant passage 17 through which a coolant, such as cool water, is circulated to cool the cold runner 14 and thereby avoid undesirable curing of the silicone rubber as it passes through, or stays in the cold runner 14.

The lower mold member 11 is provided with a heater 22 to surround the cavity 9 in order to effectively cure the silicone rubber material M which has been injected into the cavity 9. On the other hand, the upper mold member 12 is provided with a cooling passage 21 in order to cool the upper mold member 12 as a whole and thereby prevent curing of the silicone rubber material M which remains within the runner 13.

Furthermore, in order to ensure an effective cooling of the cold runner 14 by means of the cooling jacket 16, heat insulation layers 18, 19 are provided for suppressing heat conductance to the cold runner 14, from the heater 22 for curing the silicone rubber material M within the cavity 9. One of the heat insulation layers, i.e., the layer 19 arranged directly around the cold jacket 14 is comprised of a heat insulating air layer with a sufficient heat insulating property.

It is preferred that the cold runner 14 is arranged on that side of the space 8 for placing the metal plate 2, which is opposite to the cavity 9, and the outlet 14a is indirectly communicated with the cavity through the space 8, rather than a direct communication. As particularly shown in FIG. 4(b), the metal plate 2 to be placed in the space 8 of the mold has a through hole 5, which opens on that side opposite to the side where the silicone rubber member is adhered, so that the through hole 5 is aligned with the outlet 14a of the cold runner 14. It is to be noted that the cold runner 14 and the cavity 9 are separately arranged in the upper mold member 12 and the lower mold member 11, respectively, which are spaced from each other when the injection mold 10 is open, so as to ensure an efficient and effective cooling by the cold runner 14.

The cold runner 14 is provided therein with a closure pin 25, which is connected to a piston 27 of a cylinder device 26. When the closure pin 25 assumes a lower position during the process steps, except one for injecting the silicone rubber material M into the cavity 9, the closure pin 25 closes the outlet 14a, so as to prevent leakage of the silicone rubber material M from the outlet 14a of the cold runner 14, and to avoid adhesion of the runner rubber to the molded product. When the closure pin 25 assumes an upper position during the injection step, the outlet 14a of the cold runner 14 is opened and the silicone rubber material M is thus injected into the cavity 9.

In this connection, in order to even more positively avoid leakage of the silicone rubber material M from the outlet 14a of the cold runner 14, it is preferred to ensure that, when the closure pin 25 is advanced downwards for closing the outlet 14a, the tip end of the closure pin 25 is situated substantially at the parting surface of the lower mold member 11, i.e., the edge surface 8a of the space 8 opposite to the cold runner 14, or the tip end of the closure pin 25 slightly projects from the edge surface 8a into the space 8.

In order to produce the developer amount limiting blade 1 by using the injection mold 10 explained above, the mold 10 is opened and the closure pin 25 is moved downwards to close the outlet 14a of the cold runner 14. In such a state of the injection mold 10, the metal plate 2 previously applied with an adhesive is placed in the space 8 such that the through hole 5 in the metal plate 2 is aligned with, and opposed to the outlet 14a of the cold runner 14. Subsequently, the injection mold 10 is closed and the closure pin 25 is moved upwards by the cylinder device 26 so as to open the outlet 14a of the cold runner 14. The silicone rubber material M is then passed through the runner 13 and filled into the cavity 9. Immediately thereafter, the closure pin 25 is moved downwards to close the outlet 14a of the cold runner 14, and the curing step is started, wherein the silicone rubber material M within the cavity 9 is heated and thereby cured.

After the lapse of predetermined time from the starting of the heating, the injection mold 10 is opened to remove the molded product from the mold 10. On this occasion, since the silicone rubber material M is passed through the cold runner 14, the rubber within the runner 13 is not attached to the molded product, but remains within the mold 10 in uncured state. Thus, silicone rubber material M within the runner 13 can be used for a next injection.

For producing the developer amount limiting blade 1 as explained above, the viscosity of the silicone rubber material M is preferably 20-5,000 Pa·s, and more preferably 100-1,000 Pa·s. The temperature of the injection mold 10 is preferably 100-220° C., and more preferably 140-170° C. The temperature of the cold runner 14 is preferably 0-50° C., and more preferably 10-20° C.

Figure 6:
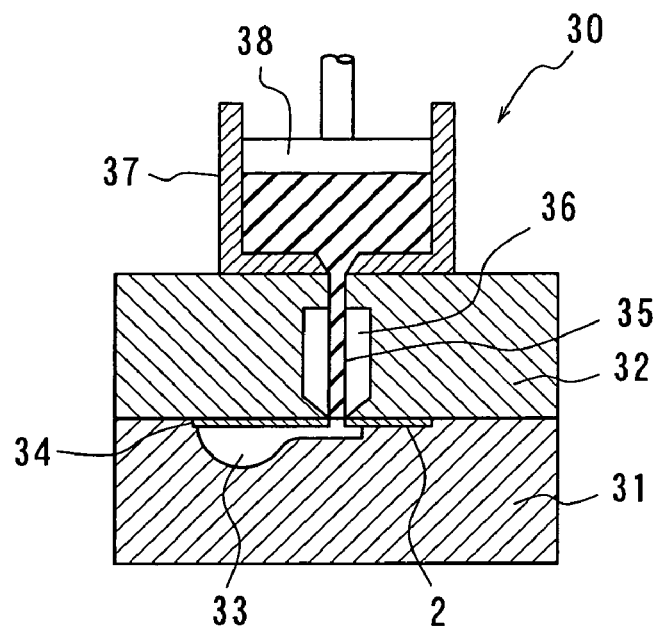
FIGS. 6 and 7 are schematic views showing further embodiments of the present invention as applied to transfer molding process.
Figure 7:
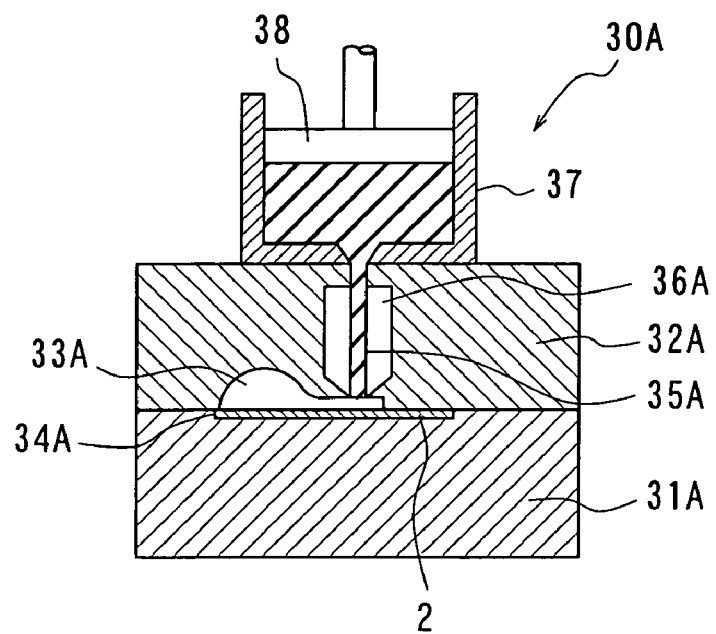

Further embodiments of the mold for producing the developer amount limiting blade according to the present invention are shown in FIGS. 6 and 7, wherein the present invention is applied to transfer molding process.

The transfer mold 30 shown in FIG. 6 is comprised of a lower mold member 31 having a space 34 for placing the metal plate 2 of the developer amount limiting blade 1 and a cavity 33 corresponding to the silicone rubber member 3 of the blade 1, and an upper mold member 32 having a runner for passing the silicone rubber material M into the cavity 33, wherein part of the runner including its outlet is formed as a cold runner 35 that can be cooled by a cooling jacket 36.

The transfer mold 30 shown in FIG. 6 is essentially the same, in terms of structure and function, as the injection mold 10 shown in FIGS. 5(a) and 5(b), except that a transfer cylinder 37 and a plunger 38 are used instead of the injection nozzle 27, and that the silicone rubber material M is supplied vertically instead of laterally.

The transfer mold 30A shown in FIG. 7 is essentially the same, in terms of structure and function, as the transfer mold 30 shown in FIG. 6, except that the cavity 33A is provided for the upper mold member 32A instead of the lower mold member 31A. However, a space 34a for placing the metal plate 2 remains in the lower mold member 31A. In this instance, the silicone rubber material M passed through the cold runner 35A is directly supplied to the cavity 33A, instead of flowing across the metal plate 2 in its thickness direction. The cooling jacket 36A for cooling the cold runner 35A, and the heating means for heating and curing the silicone rubber material M within the cavity 33A are both provided for the upper mold member 32A.

Figure 8:
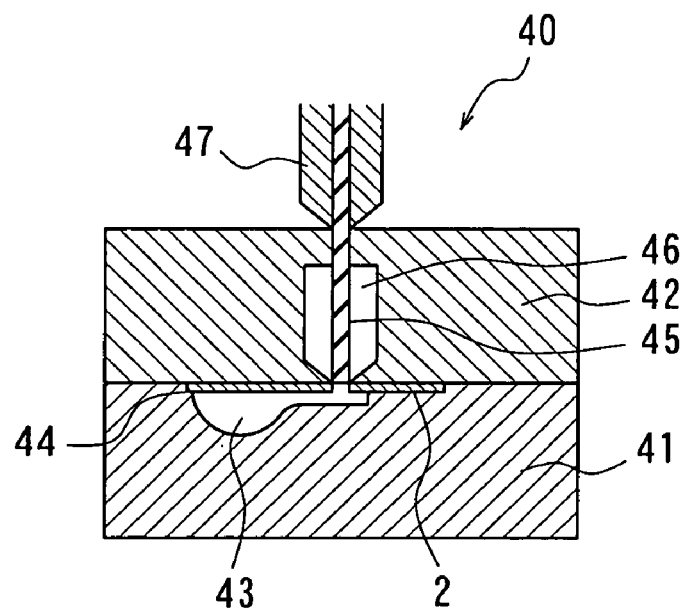
FIGS. 8 to 10 are schematic views showing still further embodiments of the present invention as applied to LIM or RIM process.
Figure 9:
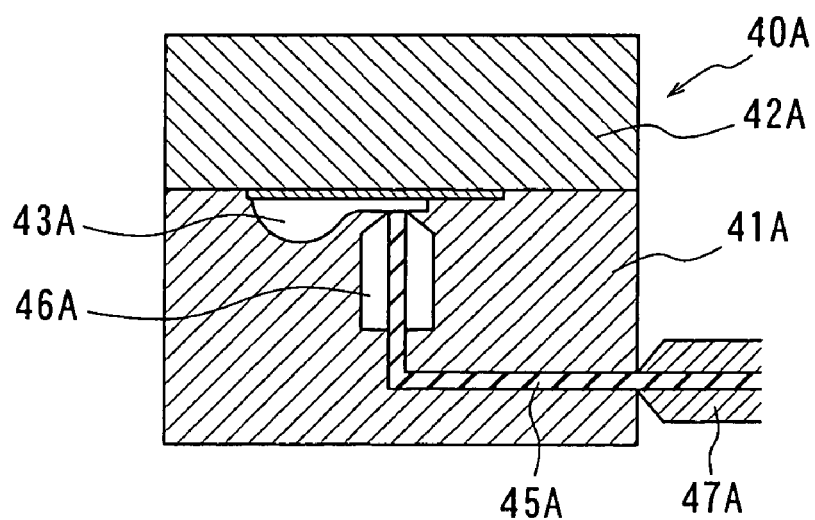
Figure 10:
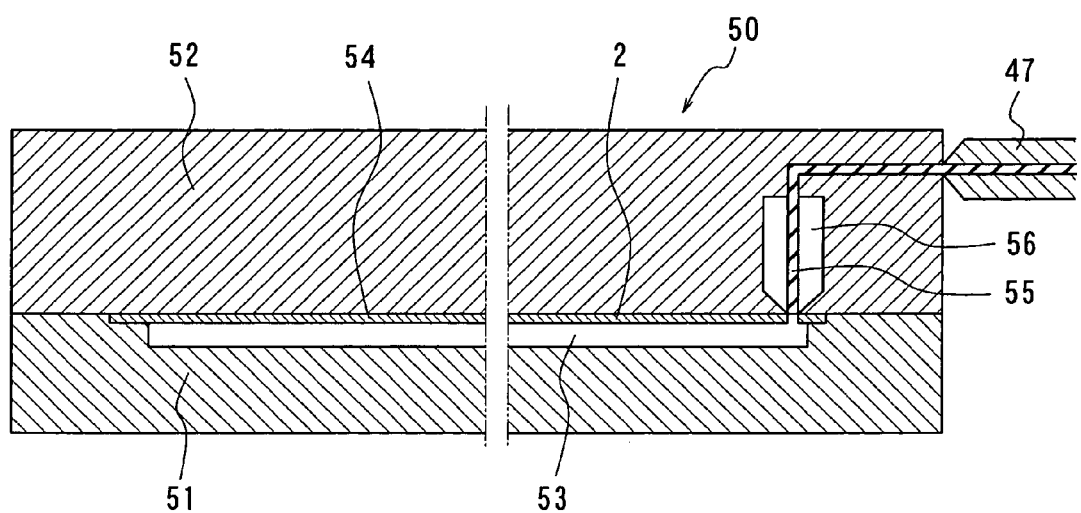

Still further embodiments of the mold for producing the developer amount limiting blade according to the present invention are shown in FIGS. 8 to 10, wherein the present invention is applied to injection molding process based on LIM or RIM technology.

The injection mold 40 shown in FIG. 8 is comprised of a lower mold member 41 having a space 44 for placing the metal plate 2 of the developer amount limiting blade 1, and a cavity 43 corresponding to the silicone rubber member 3 of the blade 1, and an upper mold member 42 having a runner for passing the silicone rubber material M therethrough and injecting it into the cavity 43, wherein part of the runner including its outlet is formed as a cold runner 45 that is cooled by a cooling jacket 46. This injection mold 40 differs from the mold of FIGS. 5(a) and 5(b) only in that the silicone rubber material M is injected from an injection nozzle 47 that is arranged on the upper part of the upper mold member 42.

The injection mold 40A shown in FIG. 9 differs from the mold 40 of FIG. 8 in that the runner is provided for the lower mold member 41A instead of the upper mold member 42A and the silicone rubber material M is injected from an injection nozzle 47A that is arranged on the lower part of the lower mold member 41A. In this instance, as explained with reference to FIG. 7, the silicone rubber material M passed through the cold runner 45A is directly supplied to the cavity 43A, instead of flowing across the metal plate 2 in its thickness direction. The cooling jacket 46A for cooling the cold runner 45A, and the heating means for heating and curing the silicone rubber material M within the cavity 43A are both provided for the lower mold member 41A.

The injection mold 50 shown in FIG. 10 is comprised of a lower mold member 51 having a space 54 for placing the metal plate 2 of the developer amount limiting blade 1, and a cavity 53 corresponding to the silicone rubber member 3 of the blade 1, and an upper mold member 52 having a runner for passing the silicone rubber material M therethrough and injecting it into the cavity 53, wherein part of the runner including its outlet is formed as a cold runner 55 that is cooled by a cooling jacket 56. This injection mold is essentially the same, in terms of structure and function, as the mold 10 shown in FIGS. 5(a) and 5(b), except that the silicone rubber material M is injected laterally from the side surface of the mold in the longitudinal direction, as opposed to the side surface in the width direction.

It will be appreciated that, according to the present invention, since at least a part of the runner, including an outlet thereof, is comprised of a cold runner, the silicone rubber material remaining in the cold runner is maintained at a temperature lower than its curing temperature and thus prevented from curing, thereby making it possible to effectively eliminate formation of undesirable runner rubber.

While the present invention has been explained above with reference to preferred embodiments, they were given by way of examples only, and various changes or modifications may be made without departing from the scope of the invention as defined by the appended claims. Thus, for example, heat-curable material as used in the present invention is not limited to silicone rubber, and other heat-curable material may be used such as two-liquid type polyurethane rubber, fluorine rubber, chloroprene rubber, etc. Also, the present invention is not limited to a developer amount limiting blade, and may be similarly applied to other blades for office appliances, such as a cleaning blade.

The invention claimed is:
1. A blade for office appliances, comprising:
a base plate, and
a resilient member made of a heat-curable material and adhered to said base plate, said heat-curable material having been subjected to curing in a cavity of a mold, with said base plate placed in a space of the mold, so that said resilient member is adhered to said base plate, wherein said base plate has a through hole for guiding said heat-curable material from a cold runner into said cavity of the mold, wherein said resilient member comprises an elongated main body portion having a side edge, and a tab projecting from said side edge of the main body portion, and wherein said through hole is formed in that portion of the base plate, to which said tab of the resilient member is adhered, and wherein said tab covers said through hole when said tab is adhered to the base plate.

2. The blade for office appliances according to claim 1, wherein said tab projects along a plane that is parallel to a plane formed by a face of the base plate to which the entire resilient member is adhered.

* * * * *